United States Patent [19]

Reilly

[11] Patent Number: 5,662,497

[45] Date of Patent: Sep. 2, 1997

[54] MODULAR BATTERY TERMINAL CONNECTOR ASSEMBLY

[75] Inventor: Christopher J. Reilly, Endicott, N.Y.

[73] Assignee: New York State Electric & Gas Corporation, Binghamton, N.Y.

[21] Appl. No.: 553,055

[22] Filed: Nov. 3, 1995

[51] Int. Cl.$^6$ .................................................. H01R 19/00
[52] U.S. Cl. .................................. 439/627; 429/158
[58] Field of Search ............................... 439/627, 500, 439/754, 504; 429/158, 159, 121, 178

[56] References Cited

U.S. PATENT DOCUMENTS

| | | |
|---|---|---|
| 1,073,670 | 9/1913 | Ford. |
| 1,460,604 | 7/1923 | Potter. |
| 1,854,489 | 4/1932 | Sebell. |
| 2,789,274 | 4/1957 | Zam ............................ 339/116 |
| 4,106,833 | 8/1978 | Wilson et al. ............... 439/504 |
| 4,156,552 | 5/1979 | Wilson et al. ............... 339/29 B |
| 4,288,504 | 9/1981 | Julian et al. ................ 429/179 |
| 4,291,106 | 9/1981 | Hooke .......................... 429/1 |
| 4,576,880 | 3/1986 | Verdier et al. ............... 429/99 |
| 4,581,306 | 4/1986 | Hasenauer et al. ......... 429/123 |
| 4,622,274 | 11/1986 | Lowrance .................. 429/1 |
| 4,657,335 | 4/1987 | Koch et al. .................. 339/256 R |
| 4,734,063 | 3/1988 | Koch et al. .................. 439/844 |
| 4,957,829 | 9/1990 | Holl ............................. 429/99 |
| 5,104,752 | 4/1992 | Baughman et al. ......... 429/1 |
| 5,378,552 | 1/1995 | Dixon, Jr. .................... 429/91 |
| 5,399,103 | 3/1995 | Kuboshima et al. ........ 429/509 |

FOREIGN PATENT DOCUMENTS

| | | | |
|---|---|---|---|
| 139818 | 11/1948 | Australia ..................... 439/754 |
| 629580 | 12/1961 | Italy ............................. 439/754 |

*Primary Examiner*—Gary F. Paumen
*Attorney, Agent, or Firm*—Roylance, Abrams, Berdo & Goodman

[57] ABSTRACT

A modular battery terminal connector assembly designed to connect batteries together in series or in parallel. The connector assembly has a first electrically conductive elbow member, an electrically conductive connecting member and a second electrically conductive connecting member. The first conductive elbow member is coupled at one end to a first terminal of a first battery, preferably, by a toolless socket which frictionally engages and grips the first terminal of the first battery. The other end of the first conductive elbow member is coupled to a second terminal of a second battery, preferably, by a toolless socket. The conductive connecting member interconnects the first and second conductive elbow members together, preferably, by a pair of toolless sockets. In some embodiments, the toolless sockets are fixedly coupled to the elbow members, while the connecting member is either a single rod or a plurality of rods interconnected by sleeve members. In other embodiments, the toolless sockets are separate, individual parts for coupling the elbow members and the connecting members together.

31 Claims, 4 Drawing Sheets

MODULAR BATTERY TERMINAL CONNECTOR ASSEMBLY

FIELD OF THE INVENTION

The present invention generally relates to a modular battery terminal connector assembly for electrically connecting a plurality of batteries together. The present invention is especially useful in electric vehicles which utilizes a plurality of batteries. Of course, the modular terminal connector assembly can also be used to connect other types of electrical terminals.

BACKGROUND OF THE INVENTION

In many applications, batteries are coupled together in series to obtain the desired voltage to provide stand alone or emergency power, or to power electrical devices such as an electric vehicle. Accordingly, many different types of electrical connectors have been developed for interconnecting the terminals of batteries so that the batteries can be electrically coupled together in series to provide the appropriate voltage to power the electrical device.

The most common type of terminal connector system utilizes flexible cables with terminal connectors crimped thereon. Other types of terminal connector systems include solid cabless connectors which are rigidly attached to the terminals. However, these prior art electrical connectors suffer from various disadvantages.

For example, many of the prior art electrical connectors require tools for their assembly. This can be time consuming and difficult to install in certain applications. Moreover, many of the prior art electrical connectors are required to be specially manufactured for that particular application. In certain cases, this can result in a number of different types of electrical connectors being used to interconnect a plurality of batteries together. Accordingly, many of the prior art electrical connectors are relatively expensive to manufacture and cannot be used in a wide variety of applications. Other limitations of prior art electrical connectors include less than optimal conductivity, and inflexibility of rigid connector to permit movement of the batteries without causing undue stress on the terminal. Many of these prior art connectors also suffer from heat build up and corrosion. Moreover, some prior art connectors utilize cables which require crimped connections.

Examples of some of the prior art electrical connectors are disclosed in the following U.S. patents: U.S. Pat. No. 1,073,670 to Ford; U.S. Pat. No. 1,460,604 to Potter; U.S. Pat. No. 1,854,489 to Sebell; U.S. Pat. No. 2,789,274 to Zam; U.S. Pat. No. 4,156,552 to Wilson et al; U.S. Pat. No. 4,288,504 to Julian et al; U.S. Pat. No. 4,291,106 to Hooke; U.S. Pat. No. 4,576,880 to Verdier et al; U.S. Pat. No. 4,581,306 to Hasenauer et al; U.S. Pat. No. 4,622,274 to Lowrance; U.S. Pat. No. 4,657,335 to Koch et al; U.S. Pat. No. 4,734,063 to Koch et al; U.S. Pat. No. 4,957,829 to Holl; U.S. Pat. No. 5,104,752 to Baughman et al; U.S. Pat. No. 5,378,552 to Dixon, Jr.; and U.S. Pat. No. 5,399,103 to Kuboshima et al.

In view of the above, it is apparent to those skilled in the art that there exists a need for a battery terminal connector assembly which is inexpensive to manufacture and relatively simple to install, and which provides interchangeability, flexibility and compatibility of individual components to be readily adaptable to a wide variety of battery arrangements to interconnect a plurality of batteries in series. This invention addresses these needs in the art, along with other needs which will become apparent to those skilled in the art once given this disclosure.

SUMMARY OF THE INVENTION

One object of the present invention is to provide a modular terminal connector assembly which can be easily installed onto the terminals of batteries without using any tools.

Another object of the present invention is to provide a modular terminal connector assembly in which both the positive and negative terminal connector can be simultaneously disconnected in a fast and efficient manner.

Yet another object of the present invention is to provide a modular terminal connector assembly which is relatively simple to manufacture as well as relatively inexpensive to manufacture.

Still another object of the present invention is to provide a modular terminal connector assembly which utilizes individual components which are interchangeable and compatible to create a plurality of connector designs.

Yet still another object of the present invention is to provide a modular terminal connector assembly which minimizes space and weight requirements for battery terminal connections so that the overall space end weight requirement for the battery terminal connector assembly is minimized.

Another object of the present invention is to provide a modular terminal connector assembly with improved electrical conductivity and minimal corrosion.

Another object of the present invention is to provide a modular terminal connector assembly which allows for adjustability in height and length to accommodate various dimensional variations in any direction (X, Y, Z) between batteries.

The foregoing objects are basically attained by a modular battery terminal connector assembly for electrically interconnecting a first terminal of a first battery to a first terminal of a second battery, comprising: a first electrically conductive elbow member having first and second ends; a first battery terminal connector having a coupling member for releasably engaging the first terminal of the first battery, the first battery terminal being coupled to the first end of the first conductive elbow member; a second electrically conductive elbow member having first and second ends; a second battery terminal connector having a coupling member for releasably engaging the first terminal of the first battery, the second battery terminal connector being coupled to the first end of the second conductive elbow member; an electrically conductive connecting member having first and second ends; first coupling member for releasably connecting the second end of the first conductive elbow member to the first end of the conductive connecting member; and a second coupling member for releasably connecting the second end of the conductive connecting member.

Other advantages and salient features of the invention will become apparent to those skilled in the art from the following detailed description, which taken in conjunction with the annexed drawings, discloses preferred embodiments of the present invention.

BRIEF DESCRIPTION OF THE DRAWINGS

Referring now to the drawings which form part of this original disclosure.

DETAILED DESCRIPTION OF THE PREFERRED EMBODIMENTS

Figure 1:
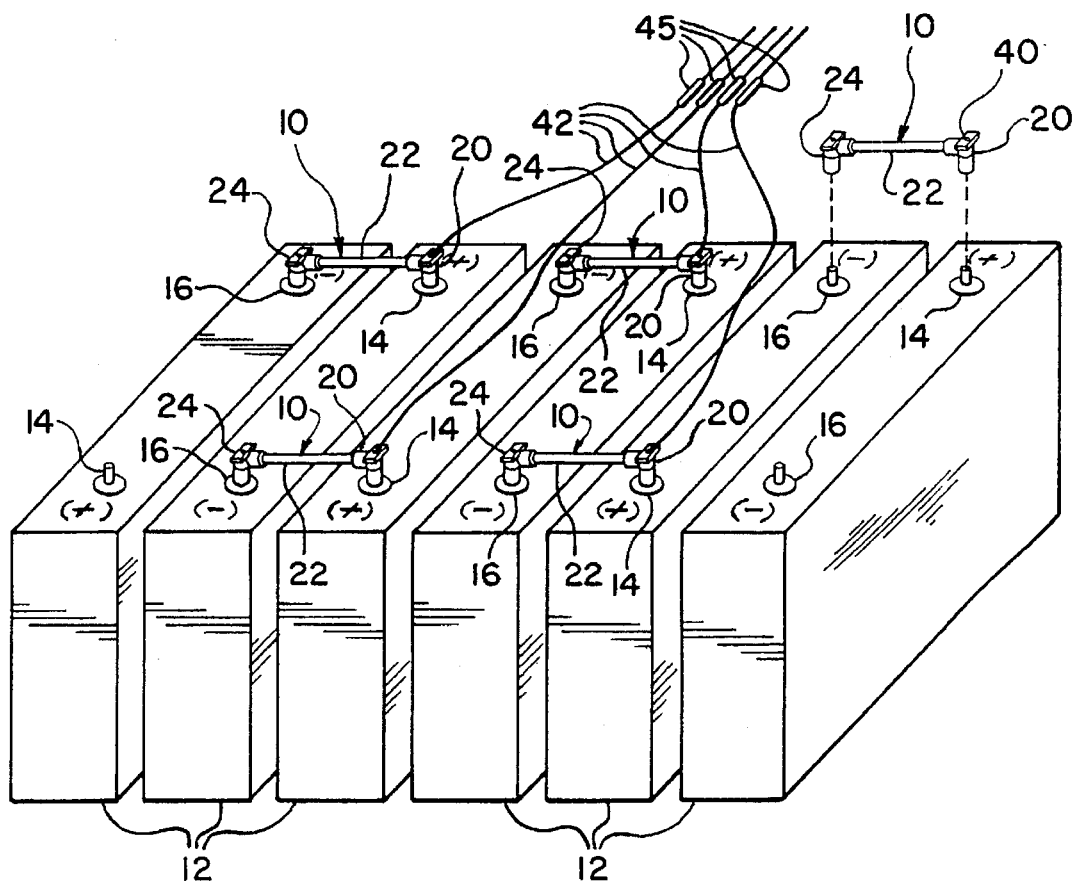
FIG. 1 is a partial perspective view of a plurality of modular battery terminal connector assemblies interconnecting a plurality of batteries together in series in accordance with a first embodiment of the present invention.

Referring initially to FIG. 1, a plurality of modular battery terminal connector assemblies 10 in accordance with the present invention are illustrated coupled to batteries 12. More specifically, battery terminal connector assemblies 10 couple the positive terminals 14 to the negative terminals 16 of adjacent pairs of batteries 12. Accordingly, batteries 12 are coupled in series to provide the desired electrical power requirements to the device, e.g., an electric vehicle (not shown).

While only six batteries 12 are illustrated in FIG. 1, it will be apparent to those skilled in the art from this disclosure that any number of batteries may be electrically coupled together via battery terminal connector assemblies 10. It will also be apparent to those skilled in the art from this disclosure that battery terminal connector assemblies 10 can be utilized to connect batteries 12 in either series or in parallel as needed and/or desired. However, only for purposes of discussion and illustration, battery terminal connector assemblies 10 will be illustrated and discussed as being coupled to batteries 12 for coupling them in series.

Battery terminal connector assemblies 10 permit a flexible, modular arrangement which permits any size battery plant to be formed from simple basic modular units or elements. Moreover, battery terminal connector assemblies 10 also are capable of accommodating minor dimensional variations between their applications to facilitate ease of installation as well as maintenance.

Each of the modular battery terminal connector assemblies 10 includes at least a first electrically conductive elbow or end member 20, an electrically conductive connecting member 22 and a second electrically conductive elbow or end member 24. Members 20, 22 and 24 are all preferably coupled together without tools such that they can be easily assembled or disassembled. More specifically, a first free end of first elbow or end member 20 is releasably coupled to one end of connecting member 22, while a first free end of second elbow or end member 24 is releasably coupled to the other end of connecting member 22 as discussed below. The second free ends of first elbow or end member 20 and second elbow or end member 22 are coupled to terminals 14 and 16 of a pair of adjacent batteries 12, respectively.

Figure 3:
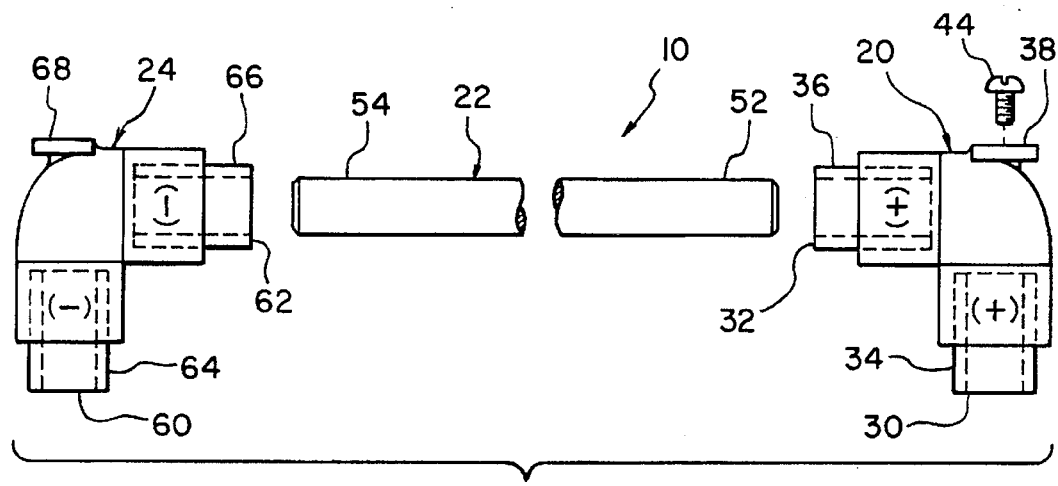
FIG. 3 is an exploded elevational view of the modular battery terminal connector assembly illustrated in FIG. 2.
Figure 4:
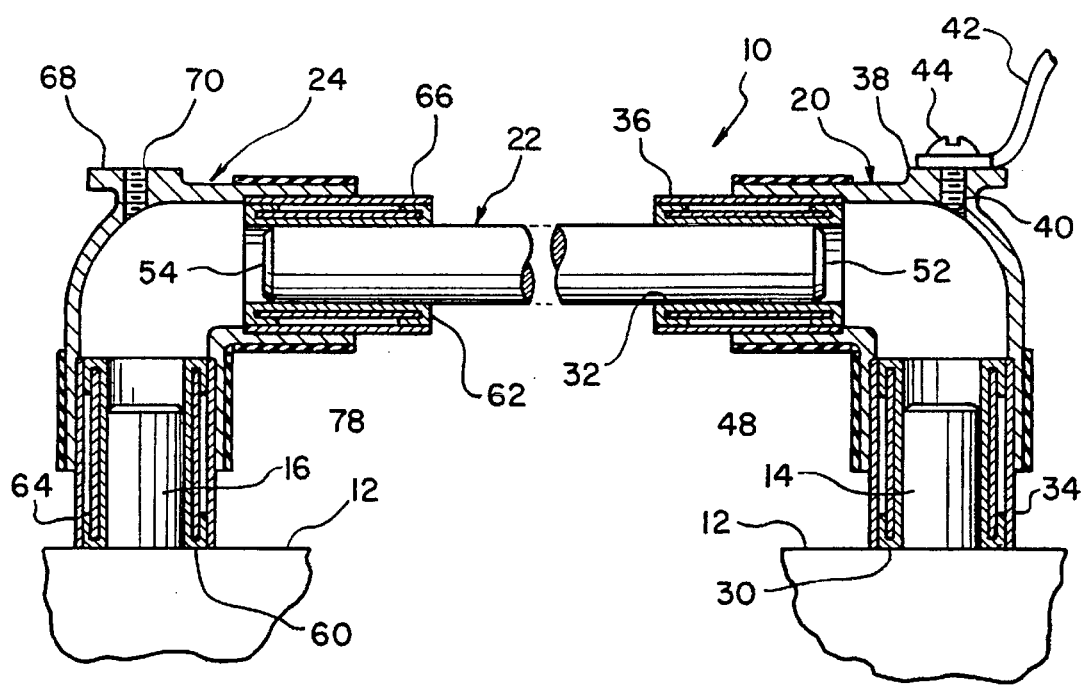
FIG. 4 is an enlarged, longitudinal cross-sectional view of the modular battery terminal connector assembly illustrated in FIGS. 1–3.

As seen in FIGS. 3 and 4, first elbow or end member 20 in this embodiment is an angled tubular member having a first open end 30 and a second open end 32. Preferably, first open end 30 lies on a first longitudinal axis and second open end 32 lies on a second longitudinal axis extending substantially perpendicular to the first longitudinal axis of first open end 30 such that first elbow or end member 20 is a right angle elbow member. Of course, it will be apparent to those skilled in the art from this disclosure that first elbow or end member 20 could have its first and second ends positioned at other angles. First elbow or end member 20 is constructed of an electrically conductive material such as brass or copper. In fact, a brass pipe fitting can be utilized for first elbow or end member 20.

Referring to FIG. 4, first end 30 of first elbow or end member 20 preferably has a first battery terminal connector 34 fixedly coupled thereto, while second open end 32 has an electrical connector 36 fixedly coupled thereto. Preferably, connectors 34 and 36 are substantially identical, toolless electrical socket type connectors which are sometimes referred to as barrel terminals. Preferably, connectors 34 and 36 are barrel terminals constructed in accordance with U.S. Pat. Nos. 4,657,335 and 4,734,063, both to Koch et al. These connectors 34 and 36 are sold under the name of RADSOCK®. Of course, other commercially available socket type connectors suitable for use in the present invention can be used.

Accordingly, "coupling means" as used in the claims to refer to connectors 34 and 36 includes all conventional connectors known in the prior art including clamping type connectors or any friction fit type connectors. However, "toolless coupling means" as used herein and in the claims refers to any type of currently available electrical connector which does not require tools for securely gripping a terminal such as the RADSOCK® connectors mentioned above or any other type of friction fit or press fit connection.

Figure 2:
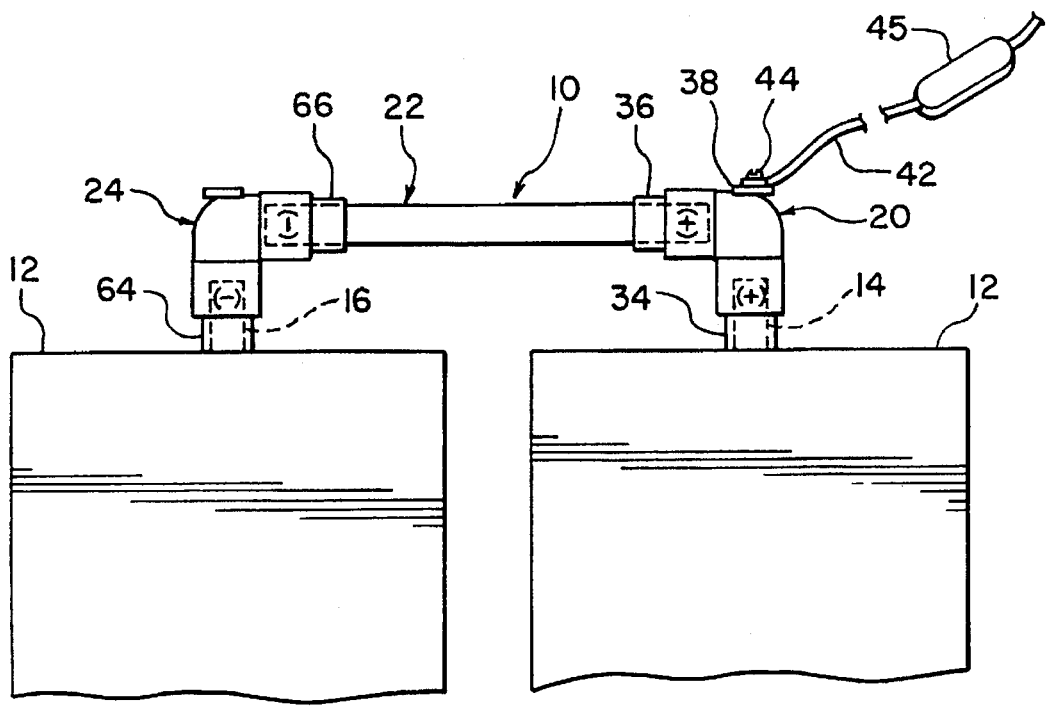
FIG. 2 is an enlarged partial elevational view of a pair of batteries with one of the modular battery terminal connector assemblies illustrated in FIG. 1 coupled thereto.

As best seen in FIGS. 2 and 4, first elbow or end member 20 can also be provided with a plate 38 with a threaded hole 40 which form a wire connection for coupling a wire 42 thereto via screw 44. Accordingly, battery terminal connector assembly 10 can be electrically connected to a battery monitoring system (not shown) via wire 42. Wire 42 can be provided with an overload protective device 45, such as a fuse, a circuit breaker, etc., to protect the battery monitoring system (not shown) electrically coupled thereto. Of course, it should be readily apparent that the elbow or end member 20 can be machined for accommodating other wire connecting devices.

Preferably, terminal connector 34 and electrical connector 36 are substantially identical in shape and size such that terminal connector 34 can be coupled to either connecting member 22 or one of the terminals 14 or 16 of batteries 12. Likewise, electrical connector 36 can be coupled to either connecting member 22 or one of the terminals 14 or 16 of one of the batteries 12.

Of course, in many instances the negative terminal of a battery is either smaller or larger than positive terminal of the battery such that different size connectors are required for each of the terminals. In such a case, terminal connector 34 and electrical connector 36 may have different size sockets or interior bores, and thus, would not be interchangeable between the terminals and connecting member 22.

If terminal connector 34 is especially designed for use only with either a positive or negative terminal of batteries 12, then first elbow or end member 20 can be provided with a synthetic rubber or plastic coating sheath 48 with a particular color and/or indicia for indicating that first elbow or end member 24 is either a positive or negative connector.

Preferably, terminal connector 34 and electrical connector 36 are press-fitted and/or soldered within first and second ends 30 and 32, respectively, of first elbow or end member 20 such that elbow or end member 20, terminal connector 34 and electrical connector 36 form a one-piece member which is not readily separable. Of course, first elbow or end member 20 and connectors 34 and 36 can be made readily separable as in some of the later embodiments discussed herein.

Connecting member 22, in this embodiment, is preferably a solid or hollow rigid conductive rod or pin made of a suitable conductive metallic material such as brass or copper. While connecting member 22 is shown as a one-piece rod in this embodiment, it will be apparent to those skilled in the art that connecting member 22 can be constructed of a plurality of modular units or elements which can be interconnected by various types of connectors to provide a continuous electrical path therein. Moreover, it will be apparent to those skilled in the art that connecting member 22 can be any desired length. In fact, the connecting rod or pin comprising connecting member 22 can be interchanged with other rods or pins of various lengths to accommodate various battery plant arrangements. Thus, the length of battery terminal connector assembly 10 can be easily adjusted by changing the length of connecting member 22.

Connecting member 22 has a first end 52 and a second end 54. Preferably, connecting member 22 has a circular cross-section with the diameters of the first and second ends 52 and 54 being substantially identical so that either end 52 or 54 may be coupled to electrical connectors 36 and 66 of elbow or end members 20 and 24, respectively. Since first and second ends 52 and 54 of connecting member 22 are slidably coupled to electrical connectors 36 and 66 of elbow or end members 20 and 24, respectively, the overall length of battery terminal connector assembly 10 can be adjusted within predetermined limits utilizing the same connecting member 22. Accordingly, battery terminal connector assembly 10 does not have to be precisely constructed as required by fixed length connectors such as the one disclosed in U.S. Pat. No. 5,378,552 to Dixon, Jr.

As best seen in FIGS. 3 and 4, second elbow or end member 24 in this embodiment is substantially identical to first elbow or end member 20, and is an angled tubular member having a first open end 60 and a second open end 62. Preferably, first open end 60 lies on a first longitudinal axis and second open end 62 lies on a second longitudinal axis extending substantially perpendicular to the first longitudinal axis of first open end 60 such that second elbow or end member 24 is a right angle elbow. Of course, it will be apparent to those skilled in the art from this disclosure that second elbow or end member 24 can have its first and second open ends positioned at other angles. Preferably, second elbow or end member 24 is constructed of an electrically conductive material such as brass or copper. In fact, a brass pipe fitting can be utilized for second elbow or end member 24.

First end 60 of second elbow or end member 24 preferably has a second battery terminal connector 64 fixedly coupled thereto, while second open end 62 has an electrical connector 66 fixedly coupled thereto. Preferably, connectors 64 and 66 are substantially identical, toolless electrical socket type connectors, which are similar to connectors 34 and 36 discussed above.

Similar to first elbow or end member 20, second elbow or end member 24 is provided with a plate 68 with a threaded hole 70 which form a wire connection for coupling a wire (not shown) thereto via a screw (not shown). Accordingly, battery terminal connector assembly 10 can be connected to a battery monitoring system (not shown) via a wire.

Preferably, terminal connector 64 and electrical connector 66 are substantially identical in shape and size such that terminal connector 64 can be coupled to either connecting member 22 or one of the terminals 14 or 16 of batteries 12. Likewise, electrical connector 36 can be coupled to either connecting member 22 or one of the terminals 14 or 16 of one of the batteries 12.

Of course, in many instances, the negative terminal of a battery is either smaller or larger than the positive terminal of the battery such that different size connectors are required for each of the terminals. In such a case, terminal connector 64 and electrical connector 66 may have different sizes, and thus, would not be interchangeable between the terminals and the connecting member 22.

If terminal connector 64 is especially designed for use only with either a negative terminal or a positive terminal, then second elbow or end member 24 can be provided with a synthetic rubber or plastic coating sheath 78 with a particular color and/or indicia for indicating that second elbow or end member 24 is either a positive or a negative connector.

Preferably, terminal connector 64 and electrical connector 66 are soldered within first and second ends 60 and 62, respectively, of second elbow or end member 24 such that elbow or end member 24, terminal connector 64 and electrical connector 66 form a one-piece member which is not readily as separable. Of course, second elbow or end member 24 and connectors 64 and 66 can be made readily separable as in some of the later embodiments discussed herein.

Installation of Modular Battery Terminal Connector Assemblies 10

Battery terminal connector assemblies 10 can be easily and quickly installed onto terminals 14 and 16 of batteries 12 without the need for any tools. In particular, the terminals 14 and 16 of an adjacent pair of batteries 12 are interconnected by battery terminal connector assemblies 10 by first determining the distance between the terminals to be electrically coupled together. Now, a connecting member 22 with the appropriate length must be either selected and/or created to span the distance between the terminals 14 and 16 to be coupled together. This can be accomplished by either selecting a pin or rod for connecting member 22 having substantially the desired length or by coupling two or more rods of the same size or different sizes together, as discussed below to create a connecting member of the desired length for extending between elbow or end members 20 and 24.

Once the appropriate connecting member 22 is selected and/or constructed, first end 52 of connecting member 22 is electrically coupled to electrical connector 36 of first elbow or end member 20 by axially inserting first end 52 of connecting member 22 into the interior socket or bore of electrical connector 36. As seen in FIG. 4, electrical connector 36 engages and grips first end 52 of connecting member 22 to provide a secure friction fit therebetween. Thus, first end 52 of connecting member 22 is releasably retained to first elbow or end member 20 via electrical connector 36 for providing an electrically conductive path between first elbow or end member 20 and electrical connector 22.

Next, second end 54 of connecting member 22 is electrically coupled to second elbow or end member 24 via electrical connector 66. More specifically, second end 54 of connecting member 22 is axially inserted into the interior socket or bore of electrical connector 66 to releasably retain second end 54 of connecting member 22 to second elbow or end member 24. As seen in FIG. 4, electrical connector 66 engages and grips second end 54 of connecting member 22 to provide a secure friction fit therebetween. Accordingly, electrical connector 66 releasably retains second end 54 of connecting member 22 to second elbow or end member 24 to form electrically conductive path therebetween.

Now that modular battery terminal connector assembly 10 is completely assembled, it can be installed onto terminals 14 and 16 of adjacent batteries 12. In particular, first elbow or end member 20 is electrically coupled to the positive terminal 14 of one of the batteries 12, while second elbow or end member 24 is electrically connected to negative terminal 16 of an adjacent one of the batteries 12. More specifically, first battery terminal connector 34 and second battery terminal connector 64 are axially inserted over terminals 14 and 16 of adjacent batteries 12 such that elbow or end members 20 and 24 are releasably retained thereon by a friction fit. In other words, terminal connectors 34 and 64 engage and grip terminals 14 and 16 to provide a secure electrical connector therebetween. Accordingly, elbow or end members 20 and 24 together with connecting member 22 provides an electrically conductive path extending between terminals 14 and 16.

It is apparent that the connections of terminal connector 34 and 64 to terminals 14 and 16 are done nearly simultaneously such that contact with other parts, such as parts of an electric vehicle, is avoided. Moreover, due to the friction fit connections of electrical connectors 36 and 66, the distance between first battery terminal connector 34 and second battery terminal connector 64 can be adjusted to accommodate minor dimensional variations to provide easy installation on terminals 14 and 16.

Optionally, wire 42 can be electrically connected to battery terminal connector assembly 10 for electrically coupling battery terminal connector assembly 10 to a conventional battery monitoring system. More specifically, wire 42 can be coupled to either first elbow or end member 20 or second elbow or end member 24 via screw 44 which can be threaded into threaded hole 40 or 70 of elbow or end members 20 or 24.

The above-mentioned steps are then repeated for each of the other battery terminal connector assemblies 10 so that all of the terminals of the batteries 20 are interconnected in series to produce the desired voltage. Of course, as mentioned above, batteries 12 can also be connected in parallel by battery terminal connector assemblies 10, if needed and/or desired by merely connecting the positive terminals of adjacent batteries together and the negative terminals of adjacent batteries together.

Modular Battery Terminal Connector Assembly 110

Figure 5:
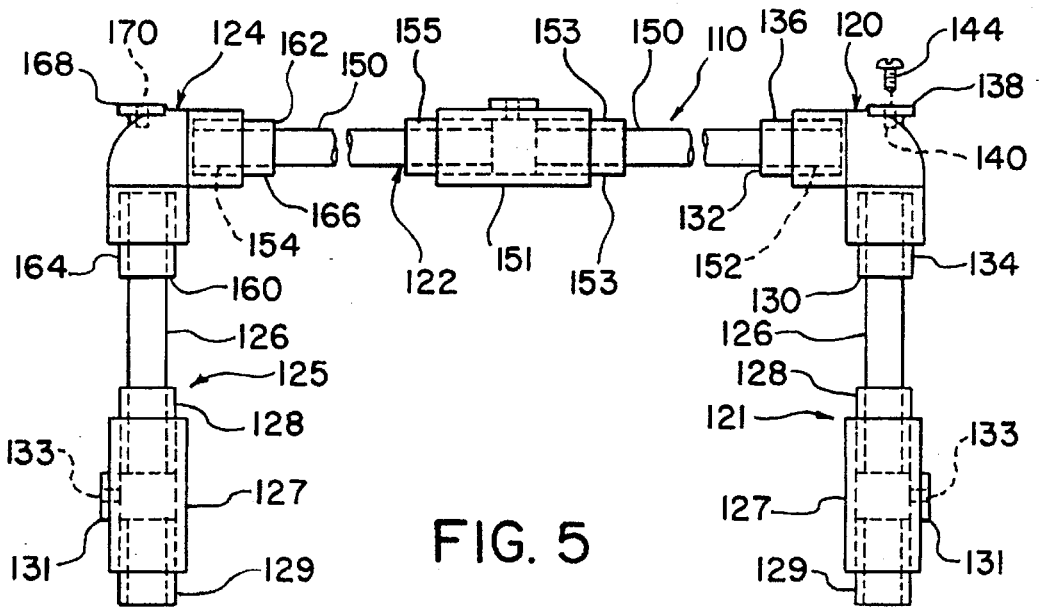
FIG. 5 is an elevational view of a modular battery terminal connector assembly in accordance with a second embodiment of the present invention.

Referring now to FIG. 5, a modular battery terminal connector assembly 110 in accordance with a second embodiment is illustrated. Battery terminal connector assembly 110 includes a first electrically conductive elbow or end member 120 with a first electrical conductive terminal connector extension 121, an electrically conductive connecting member 122 and a second electrically conductive elbow or end member 124 with a second electrically conductive terminal connector extension 125.

Battery terminal connector assembly 110 is substantially identical to battery terminal connector assembly 10, except that connecting member 122 of battery terminal connector assembly 110 is constructed of a plurality of elements or units instead of a single solid rod or pin as in the battery terminal connector assembly 10 of the first embodiment, and elbow or end members 120 and 124 include terminal connector extensions 121 and 125, respectively. Accordingly, electrical connector assembly 110 will not be discussed or illustrated in detail herein.

Members 120, 122 and 124 are all preferably coupled together without tools such that they may be easily assembled or disassembled. More specifically, a first free end of first elbow or end member 120 is releasably coupled to one end of connecting member 122, and a first free end of second elbow or end member 124 is releasably coupled to the other end of connecting member 122 as discussed below. The second free ends of first elbow or end member 120 and second elbow or end member 122 are coupled to the terminals of a pair of adjacent batteries.

First elbow or end member 120 in this embodiment is an angled tubular member having a first open end 130 and a second open end 132. Preferably, first open end 130 lies on a first longitudinal axis and second open end 132 lies on a second longitudinal axis extending substantially perpendicular to the first longitudinal axis of first open end 130 such that first elbow or end member 120 is a right angle elbow. Of course, it will be apparent to those skilled in the art from this disclosure that first elbow or end member 120 could have its first and second ends positioned at other angles. First elbow or end member 120 is constructed of an electrically conductive material such as brass or copper.

First end 130 of first elbow or end member 120 preferably has an electrical connector 134 fixedly coupled thereto, while second open end 132 has an electrical connector 136 fixedly coupled thereto. Preferably, connectors 134 and 136 are substantially identical, toolless electrical socket type connectors such as those discussed above.

First elbow or end member 120 can also be provided with a plate 138 with a threaded hole 140 which together form a wire connection for coupling a wire thereto via screw 144. Accordingly, battery terminal connector assembly 10 can be connected to a battery monitoring system (not shown) via a wire in the same manner as discussed above in the first embodiment.

Preferably, electrical connectors 134 and 136 are soldered within first and second ends 130 and 132, respectively, of first elbow or end member 120 such that elbow or end member 120, electrical connectors 134 and 136 form a one-piece member which is not readily separable.

Terminal connector extension 121 includes an electrically conductive rod or pin 126 and a straight sleeve or coupling member 127 with a pair of electrical connectors 128 and 129 fixedly coupled thereto. Pin 126 is preferably a solid or hollow rigid conductive metallic member with a circular or annular cross-section sufficient to carry the desired current.

Coupling member 127 is preferably a tubular member constructed of a rigid conductive material such that an electrical path is formed between electrical connectors 128 and 129. Electrical connectors 128 and 129 are preferably toolless electrical socket type connectors similar to those discussed above. More specifically, electrical connector 128 is designed to engage and grip pin 126 via a friction fit to electrically couple and releasably retain pin 126 thereto. Electrical connector 129, on the other hand, engages and grips a terminal of a battery via a friction fit to electrically couple and releasably retain elbow or end member 120 to a terminal of a battery. Coupling member 127 can also include a plate 131 with a thread hole 133 for forming a wire connection to electrically couple a wire thereto.

It will be apparent to those skilled in the art that terminal connector extension 121 can include additional pins 126 and coupling members 127 to create the desired arrangement. Moreover, coupling member 127 could be angled instead of straight if needed and/or desired.

Connecting member 122, in this embodiment, includes a pair of solid or hollow rigid conductive rods or pins 150 and a straight sleeve or coupling member 151. It will be apparent to those skilled in the art that connecting member 122 can be constructed of a plurality of pins 150 and coupling members 151 which can be interconnected to provide a continuous electrical path therein. Accordingly, connecting member 122 can be made to any desired length by changing the number and/or the length of pins 150 being connected together by one or more coupling members 151 to accommodate various battery plant arrangements.

Connecting member 122 has a first end 152 and a second end 154 formed by pins 150. Preferably, pins 150 have a circular cross-section with their diameters being substantially identical so that either end 152 or 154 may be coupled to electrical connectors 136 and 166 of elbow or end members 120 and 124, respectively. Since first and second ends 152 and 154 of connecting member 122 are slidably coupled to electrical connectors 136 and 166 of elbow or end members 120 and 124, respectively, the overall length of battery terminal connector assembly 110 can be adjusted within predetermined limits utilizing the same connecting member 122.

Coupling member 151 is substantially identical to coupling member 127, discussed above, and thus, will not be discussed in detail herein. Basically coupling member 151 includes a pair of toolless electrical connectors 153 and 155 fixedly coupled thereto for engaging and gripping pins 150 to form an electrical conductive path.

Second elbow or end member 124 in this embodiment is substantially identical to first elbow or end member 120, and is an angled tubular member having a first open end 160 and a second open end 162. Preferably, first open end 160 lies on a first longitudinal axis and second open end 162 lies on a second longitudinal axis extending substantially perpendicular to the first longitudinal axis of first open end 160 such that second elbow or end member 124 is a right angle elbow. Of course, it will be apparent to those skilled in the art from this disclosure that second elbow or end member 124 can have its first and second open ends positioned at other angles. Preferably, second elbow or end member 124 is constructed of an electrically conductive material such as brass or copper.

First end 160 of second elbow or end member 124 preferably has an electrical connector 164 fixedly coupled thereto, while second open end 162 has an electrical connector 166 fixedly coupled thereto. Preferably, connectors 164 and 166 are substantially identical, toolless electrical socket type connectors, which are similar to connectors 134 and 136 discussed above.

Similar to first elbow or end member 120, second elbow or end member 124 is provided with a plate 168 with a threaded hole 170 which form a wire connection for coupling a wire (not shown) thereto via a screw (not shown). This allows battery terminal connector assembly 10 to be connected to a battery monitoring system (not shown) via a wire in a manner similar to the first embodiment discussed above.

Preferably, terminal connector 164 and electrical connector 166 are soldered or press-fitted within first and second ends 160 and 162, respectively, of second elbow or end member 124 such that elbow or end member 124, terminal connector 164 and electrical connector 166 form a one-piece member which is not readily separable.

Terminal connector extension 125 is substantially identical to terminal connector extension 121. Thus, the same reference numerals will be used to describe similar parts of terminal connector extension 121, which includes an electrically conductive rod or pin 126 and a straight sleeve or coupling member 127 with a pair of electrical connectors 128 and 129 fixedly coupled thereto. Pin 126 is preferably a solid rigid conductive metallic member with a circular cross-section.

Coupling member 127 is preferably a tubular member constructed of a rigid conductive material such that an electrical path is formed between electrical connectors 128 and 129. Electrical connectors 128 and 129 are preferably toolless electrical socket type connectors similar to those discussed above. More specifically, electrical connector 128 is designed to engage and grip pin 126 via a friction fit to electrically couple and releasably retain pin 126 thereto. Electrical connector 129, on the other hand, engages and grips a terminal of a battery via a friction fit to electrically couple and releasably retain elbow or end member 124 to a terminal of a battery.

It will be apparent to those skilled in the art that terminal connector extension 125 can include additional pins 126 and coupling members 127 to create the desired arrangement. Moreover, coupling member 127 could be angled instead of straight if needed and/or desired.

Modular Battery Terminal Connector Assembly 210

Figure 6:
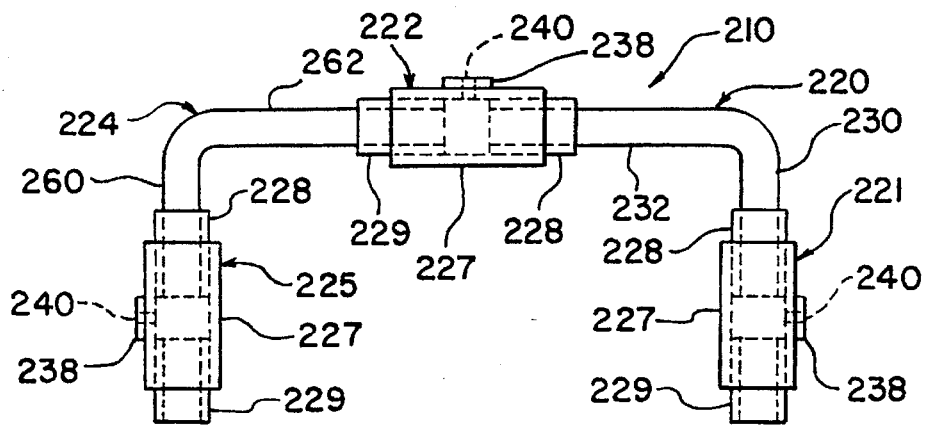
FIG. 6 is an elevational view of a modular battery terminal connector assembly in accordance with a third embodiment of the present invention.

Referring now to FIG. 6, a modular battery terminal connector assembly 210 in accordance with a third embodiment of the present invention is illustrated. Battery terminal connector assembly 210 includes a first elbow or end member 220 with a straight sleeve or coupling member 221 releasably coupled thereto, a connecting member 222 in the form of a straight sleeve or coupling member and a second elbow or end member 224 with a straight sleeve or coupling member 225 releasably coupled thereto.

Battery terminal connector assembly 210 is somewhat similar in construction and installation to battery terminal connector assemblies 10 and 110 of the first and second embodiments. Accordingly, battery terminal connector assembly 210 will not be discussed or illustrated in detail herein.

First elbow or end member 220 is preferably a solid or hollow, rigid metallic rod which is bent to form a right angle. More specifically, elbow or end member 220 has a first leg or end 230 and a second leg or end 232. Preferably, first leg 230 lies on a first longitudinal axis and second leg 232 lies on a second longitudinal axis extending substantially perpendicular to the first longitudinal axis of the first leg 230 such that first elbow or end member 220 is a right angle elbow. Of course, it will be apparent to those skilled in the art from this disclosure that first elbow or end member 220 can be bent to form other angles. Preferably, first elbow or end member 220 is constructed of an electrically conductive material such as brass or copper.

Straight sleeve or coupling member 221 is releasably coupled between first leg 230 of first elbow or end member 220 and one of the terminals of a battery. Coupling member 221 is substantially identical to coupling member 127 of the second embodiment, discussed above. In particular, coupling member 221 includes a sleeve 227 with a pair of electrical connectors 228 and 229 fixedly coupled thereto in a conventional manner such as soldering or press-fitting thereto. Preferably, sleeve 227 is a tubular member constructed of a rigid conductive material such that an electrical path is formed between electrical connectors 228 and 229. Electrical connectors 228 and 229 are preferably toolless electrical socket type connectors similar to those discussed above.

More specifically, electrical connector 228 is designed to engage and grip first leg 230 of first elbow or end member 220 via a friction fit to electrically couple and releasably retain coupling member 221 thereto. Electrical connector 229, on the other hand, engages and grips a terminal of a battery via a friction fit to electrically couple and releasably retain coupling member 221 to a terminal of a battery.

It will be apparent to those skilled in the art that a terminal connector extension similar to terminal connector extension 121 of the second embodiment, discussed above, can be added or coupled to coupling member 221 if needed and/or desired.

Sleeve 227 can also be provided with a plate 238 with a threaded hole 240 for forming a wire connection to couple a wire thereto via screw 244. Accordingly, battery terminal connector assembly 210 can be connected to a battery monitoring system (not shown) in a similar manner as discussed above in the first embodiment.

Connecting member 222 is formed by a straight sleeve or coupling member which is substantially identical to straight sleeve or coupling member 221 discussed above. Accordingly, coupling members 221 and 222 are preferably interchangeable and the same reference numerals will be used to identify similar parts. Of course, it may be necessary in certain applications to design the electrical connector of coupling member 221 to accommodate the shape of a terminal which may be different than the shape of rod or pin 250.

Similar to coupling member 221, connecting member 222 includes a sleeve 227 with a pair of electrical connectors 228 and 229 fixedly coupled thereto in a conventional manner such as soldering or press-fitting thereto. Preferably, sleeve 227 of connecting member 222 is a tubular member constructed of a rigid conductive material such that an electrical path is formed between electrical connectors 228 and 229 of connecting member 222. Electrical connectors 228 and 229 of connecting member 222 are preferably toolless electrical socket type connectors similar to those discussed above.

More specifically, electrical connector 228 of connecting member 222 is designed to engage and grip second leg 232 of first elbow or end member 220 via a friction fit to electrically couple and releasably retain connecting member 222 thereto. Electrical connector 229 of connecting member 222, on the other hand, engages and grips second leg 262 of second elbow or end member 224 via a friction fit to electrically couple and releasably retain connecting member 222 to second elbow or end member 224.

It will be apparent to those skilled in the art that a terminal connector extension similar to terminal connector extension 121 of the second embodiment, discussed above, can be added or coupled to connecting member 222 if needed and/or desired.

Sleeve 227 of connecting member 222 can also be provided with a plate 238 with a threaded hole 240 for forming a wire connection to couple a wire thereto via a screw. Accordingly, battery terminal connector assembly 210 can be connected to a battery monitoring system (not shown) in a similar manner as discussed above in the first embodiment.

Second elbow or end member 224 is preferably substantially identical to first elbow or end member 220, and thus will not be discussed in detail herein. Basically, second elbow or end member 224 has a first leg or end 260 and a second leg or end 262. Preferably, first leg 260 lies on a first longitudinal axis and second leg 262 lies on a second longitudinal axis extending substantially perpendicular to the first longitudinal axis of the first leg 260 such that second elbow or end member 224 is a right angle elbow.

Of course, it will be apparent to those skilled in the art from this disclosure that second elbow or end member 224 can be bent to form other angles. Preferably, second elbow or end member 224 is constructed of an electrically conductive material such as brass.

Straight sleeve or coupling member 225 is releasably coupled between first leg 260 of second elbow or end member 224 and one of the terminals of a battery. Coupling member 225 is substantially identical to coupling member 221, discussed above. In particular, coupling member 225 also includes a sleeve 227 with a pair of electrical connectors 228 and 229 fixedly coupled thereto in a conventional manner such as soldering. Preferably, sleeve 227 is a tubular member constructed of a rigid conductive material such that an electrical path is formed between electrical connectors 228 and 229 of coupling members 225. Electrical connectors 228 and 229 of coupling member 225 are preferably toolless electrical socket type connectors similar to those discussed above.

More specifically, electrical connector 228 of coupling member 225 is designed to engage and grip first leg 260 of second elbow or end member 224 via a friction fit to electrically couple and releasably retain coupling member 225 thereto. Electrical connector 229 of coupling member 225, on the other hand, engages and grips a terminal of a battery via a friction fit to electrically couple and releasably retain coupling member 225 to a terminal of a battery.

It will be apparent to those skilled in the art that a terminal connector extension similar to terminal connector extension 121 of the second embodiment, discussed above, can be added or coupled to coupling member 225 if needed and/or desired.

Sleeve 227 of coupling member 225 can also be provided with a plate 238 with a threaded hole 240 for forming a wire connection to couple a wire thereto via a screw. Accordingly, battery terminal connector assembly 210 can be connected to a battery monitoring system (not shown) in a similar manner as discussed above in the first embodiment.

Modular Battery Terminal Connector Assembly 310

Figure 7:
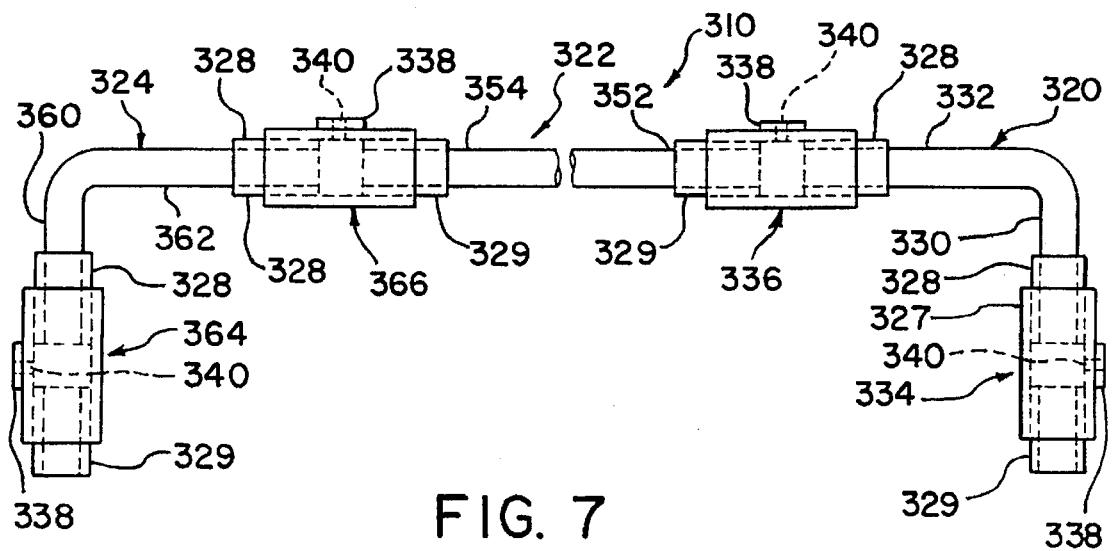
FIG. 7 is an elevational view of a modular battery terminal connector assembly in accordance with a fourth embodiment of the present invention.

Referring now to FIG. 7, a modular battery terminal connector assembly 310 in accordance with a fourth embodiment of the present invention is illustrated. Modular battery terminal connector assembly 310 includes a first elbow or end member 320 with a pair of straight sleeve or coupling members 334 and 336 releasably coupled thereto, a connecting member 322 in the form of a rod or pin, and a second elbow or end member 324 with a pair of straight sleeve or coupling member 364 and 366 releasably coupled thereto.

Battery terminal connector assembly 310 is substantially identical to electrical connector assembly 210, discussed above, except that connecting member 322 of battery terminal connector assembly 310 is constructed of a plurality of units instead of a single sleeve member as in battery terminal connector assembly 210 of the third embodiment. Thus, modular battery terminal connector assembly 310 will not be discussed or illustrated in detail herein.

First elbow or end member 320 is preferably a solid or hollow, rigid metallic rod which is bent to form a right angle. More specifically, elbow or end member 320 has a first leg or end 330 and a second leg or end 332. Preferably, first leg 330 lies on a first longitudinal axis and second leg 332 lies on a second longitudinal axis extending substantially perpendicular to the first longitudinal axis of the first leg 330 such that first elbow or end member 320 is a right angle elbow. Of course, it will be apparent to those skilled in the art from this disclosure that first elbow or end member 320 can be bent to form other angles. Preferably, first elbow or end member 320 is constructed of an electrically conductive material such as brass or copper.

One of the straight sleeve or coupling member 334 is releasably coupled between first leg 330 of first elbow or end member 320 and one of the terminals of a battery, while the other straight sleeve or coupling member 336 is releasably coupled between second leg 332 of first elbow or end member 320 and connecting member or pin 322. Coupling members 334 and 336 are substantially identical to coupling members of the preceding embodiment, discussed above. In particular, each of the coupling members 334 and 336 includes a sleeve 327 with a pair of electrical connectors 328 and 329 fixedly coupled thereto in a conventional manner such as soldering or press-fitting thereto. Preferably, sleeve 327 is a tubular member constructed of a rigid conductive material such that an electrical path is formed between electrical connectors 328 and 329. Electrical connectors 328 and 329 are preferably toolless electrical socket type connectors similar to those discussed above.

More specifically, electrical connectors 328 of coupling members 334 and 336 are designed to engage and grip first and second legs 330 and 332 of first elbow or end member 320 via a friction fit to electrically couple and releasably retain coupling members 334 and 336 thereto. Electrical connectors 329 of coupling members 334 and 336, on the other hand, engage and grip one end of connecting member 322 and a terminal of a battery via a friction fit, respectively, to electrically couple and releasably retain first elbow or end member 320 between connecting member 322 and a terminal of a battery.

It will be apparent to those skilled in the art that a terminal connector extension similar to terminal connector extension 121 of the second embodiment, discussed above, can be added or coupled to coupling members 334 and/or 336 if needed and/or desired.

Each of the sleeves 327 of coupling members 334 and 336 can also be provided with a plate 338 with a threaded hole 340 for forming a wire connection to couple a wire thereto via a screw. Accordingly, battery terminal connector assembly 310 can be connected to a battery monitoring system (not shown) in a similar manner as discussed above in the first embodiment.

Connecting member 322 is formed by a straight solid rod or pin, which is constructed of a conductive material such as brass. Connecting member or pin 322 has a first end 352 releasably coupled to coupling member 336 and a second end 354 releasably coupled to coupling member 366.

Coupling members 364 and 366 are substantially identical to straight sleeve or coupling members 334 and 336 discussed above. Accordingly, coupling members 334, 336, 364 and 366 are all preferably interchangeable and the same reference numerals will be used to identify similar parts.

Each of the coupling members 364 and 366, includes a sleeve 327 with a pair of electrical connectors 328 and 329 fixedly coupled thereto in a conventional manner such as soldering. Preferably, sleeves 327 of each coupling members 364 and 366 are tubular members constructed of a rigid conductive material such that an electrical path is formed between electrical connectors 328 and 329 of each coupling members 364 and 366. Electrical connectors 328 and 329 of each coupling members 364 and 366 are preferably toolless electrical socket type connectors similar to those discussed above.

More specifically, electrical connectors 328 of coupling members 364 and 366 are designed to engage and grip the first and second legs of elbow or end member 324 via a friction fit to electrically couple and releasably retain coupling members 364 and 366 thereto. Electrical connectors 329 of coupling members 364 and 366, on the other hand, engage and grip one end of connecting member 322 and a terminal of a battery via a friction fit, respectively, to electrically couple and releasably retain second elbow or end member 324 between connecting member 322 and a terminal of a battery.

It will be apparent to those skilled in the art that a terminal connector extension similar to terminal connector extension 121 of the second embodiment, discussed above, can be added or coupled to coupling members 364 and/or 366 if needed and/or desired.

Each of the coupling members 364 and 366 can also be provided with a plate 338 with a threaded hole 340 for forming a wire connection to couple a wire thereto via a screw. Accordingly, battery terminal connector assembly 310 can be connected to a battery monitoring system (not shown) in a similar manner as discussed above in the first embodiment.

Second elbow or end member 324 is preferably substantially identical to first elbow or end member 320, and thus will not be discussed in detail herein. Basically, second elbow or end member 324 has a first leg or end 362 and a second leg or end 364. Preferably, first leg 362 lies on a first longitudinal axis and second leg 364 lies on a second longitudinal axis extending substantially perpendicular to the first longitudinal axis of the first leg 362 such that second elbow or end member 324 is a right angle elbow.

Of course, it will be apparent to those skilled in the art from this disclosure that second elbow or end member 324 can be bent to form other angles. Preferably, second elbow or end member 324 is constructed of an electrically conductive material such as brass or copper.

As mentioned above, straight sleeve or coupling members 364 and 366 are releasably coupled to first leg 360 and second leg 362 of second elbow or end member 324 such that second elbow or end member 324 is electrically connected between connecting member 322 and one of the terminals of a battery.

Modular Battery Terminal Connector Assembly 410

Figure 8:
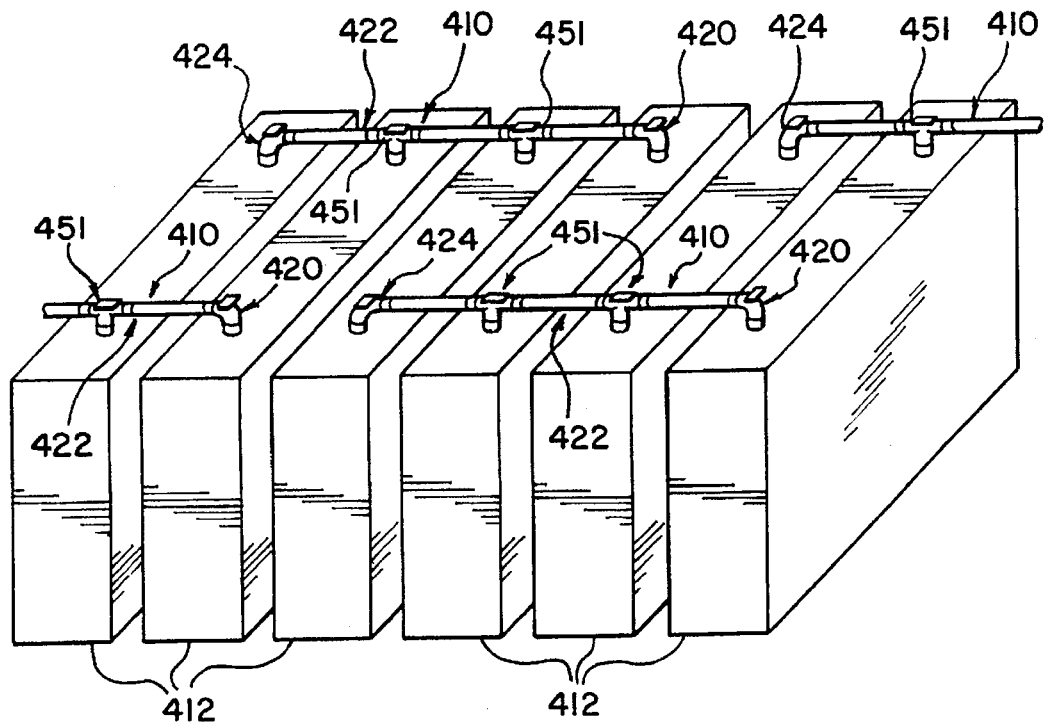
FIG. 8 is a partial perspective view of a plurality of modular battery terminal connector assemblies interconnecting a plurality of batteries together with some batteries connected in series and some batteries connected in parallel in accordance with a fifth embodiment of the present invention.
Figure 9:
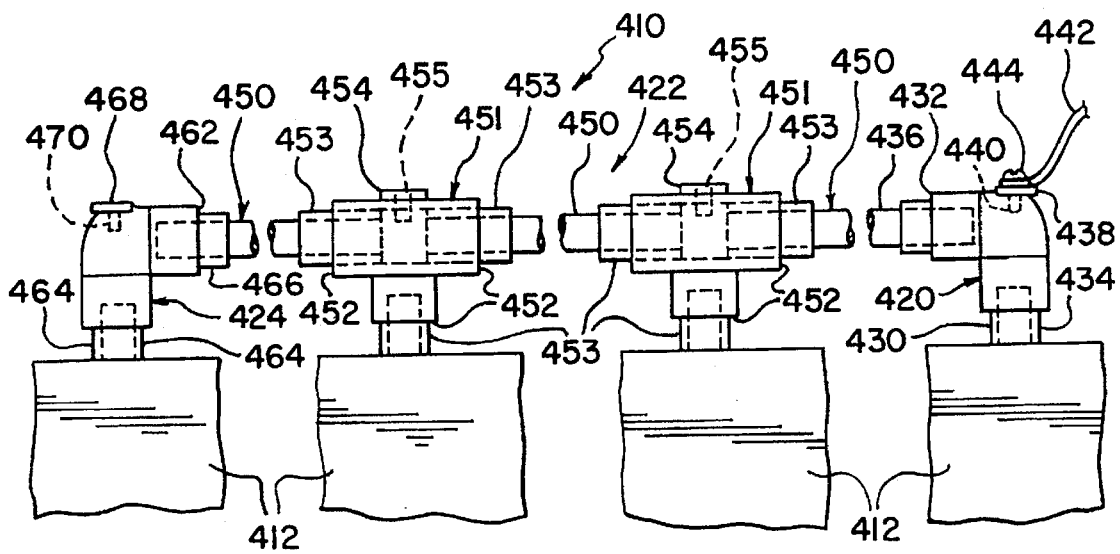
FIG. 9 is an enlarged partial elevational view of one of the modular battery terminal connector assemblies illustrated in FIG. 8.

Referring now to FIGS. 8 and 9, a modular battery terminal connector assembly 410 in accordance with a fifth embodiment of the present invention is illustrated. Battery terminal connector assembly 410 is connected to a plurality of batteries 412 for interconnecting some of the batteries 412 in series and some of the batteries 412 in parallel. Battery terminal connector assembly 410 includes a first electrically conductive elbow or end member 420, an electrically conductive connecting member 422 and a second electrically conductive elbow or end member 424. Members 420, 422 and 424 are all preferably coupled together without tools such that they can be easily assembled or disassembled.

Battery terminal connector assembly 410 is similar to the previously discussed battery terminal connector assemblies. More specifically, first and second electrical conductive elbow or end members 420 and 424 are preferably identical in construction to elbow or end members 20 and 24 discussed above, as well as elbow or end members 120 and 124 also discussed above. Connecting member 422 includes parts which are similar in construction to connecting member 322 discussed above. Thus, the parts of battery terminal connector assembly 410 will not be discussed or illustrated in as much detail as above.

First elbow or end member 420 in this embodiment is an angular tubular member having a first open end 430 and a second open end 432. Preferably, first open end 430 lies on a first longitudinal axis and second open end 432 lies on a second longitudinal axis extending substantially perpendicular to the first longitudinal axis of first open end 430 such that first elbow or end member 420 is a right elbow or end member. Of course, it will be apparent to those skilled in the art that from this disclosure that first elbow or end member 420 can have its first and second ends positioned at other angles. First elbow or end member 420 is constructed of an electrically conductive material such as brass or copper.

First end 430 of first elbow or end member 420 has a first battery terminal connector 434 fixedly coupled thereto, while second open end 432 has an electrical connector 436 fixedly coupled thereto. Preferably, connectors 434 and 436 are substantially identical, toolless electrical socket type connectors which are sometimes referred to as barrel terminals.

Preferably, terminal connectors 434 and electrical connectors 436 are soldered or press-fitted within first and second ends 430 and 432, respectively, of first elbow or end member 420 such that elbow or end member 420, electrical connector 434 and electrical connector 436 form a one piece member which is not readily separable.

As best seen in FIG. 9, first elbow or end member 420 can also be provided with a plate 438 with a threaded hole 440 which form a wire connection for coupling a wire 442 thereto via screw 444. Accordingly, battery terminal connector assembly 410 can be electrically coupled to a battery monitoring system via wire 442.

Preferably, terminal connector 434 and electrical connector 436 are substantially identical in shape and size such that terminal connector 434 can be coupled to either end of connecting member 422 or one of the terminals of batteries 412.

Connecting member 422, in this embodiment, preferably includes three solid or hollow rigid conductive rods or pins 450 and a pair of T-shaped coupling members 451. Conductive rods or pins 450 are made of a suitable conductive material such as brass or copper and sized and shaped to carry the desired current. Similarly, coupling members 451 are also constructed of a electrically conductive material such as brass or copper and sized and shaped to carry the desired current.

While connecting member 422 is illustrated as being comprised of three rods 450 and two coupling members 451, it will be apparent to those skilled in the art that a greater number of rods 450 and coupling members 451 can be utilized as well as merely a pair of rods 450 and a single coupling member 451. Thus, due to the modularity of connecting member 422, any number of batteries can be connected together in either series or in parallel as needed and/or desired. Moreover, various parts from the preceding embodiments could also be utilized within this embodiment to further create other additional types of arrangements to accommodate various different battery plants.

Coupling members 451 are each preferably tubular T-shaped members constructed of a rigid conductive material such that an electrical path is formed between the battery terminal connected thereto and the respective rods 450 connected thereto. Preferably, each of the coupling members 451 has three open ends 452 with an electrical connector 453 rigidly coupled thereto. Preferably, terminal connectors 453 are soldered or press-fitted within open ends 452 of coupling members 451 such that each coupling member 451 and its respective electrical connectors 453 form a one piece member which is not readily separable.

Preferably, electrical connectors 453 are toolless electrical socket type connectors similar to those discussed above. More specifically, electrical connectors 453 are designed to engage and grip the ends of rods 450 of each of coupling members 451 and the battery terminal via a friction fit to electrically couple and releasably couple rods 450 and one of the battery terminal thereto.

Moreover, each of the coupling members 451 can also be provided with a plate 454 with a threaded hole 455 for forming a wire connection to electrically couple a wire thereto. This wire connection is similar to the wire connections discussed above, and thus, can be used for connecting the modular battery terminal connector assembly 410 to a battery monitoring system.

Second elbow or end member 424 is substantially identical to electrical connector 420 discussed above, and is an angled tubular member having a first open end 460 and a second open end 462. Preferably, first open end 460 lies on a first longitudinal axis and second open end 462 lies on a second longitudinal axis extending substantially perpendicular to the first longitudinal axis of first open end 460 such that second elbow or end member 424 is a right elbow end or member. Of course, it will be apparent to those skilled in the art from this disclosure that second elbow or end member 424 can have its first and second open ends positioned at other angles. Preferably, second elbow or end member 424 is constructed of an electrically conductive material such as brass or copper. First open end 460 of second elbow or end member 424 has an electrical connector 464 fixedly coupled thereto, while second open end 462 has an electrical connector 466 fixedly coupled thereto. Preferably, electrical connectors 464 and 466 are substantially identical, toolless electrical socket type connectors, which are similar to electrical connectors 434 and 436 discussed above.

Similar to first elbow or end member 420, second elbow or end member 424 is provided with a plate 468 with a threaded hole 470 which form a wire connection for coupling a wire (not shown) thereto via a screw (not shown). This allows battery terminal connector assembly 410 to be electrically connected to a battery monitoring system via a wire in a manner similar to the first embodiment discussed above.

Preferably, terminal connectors 464 and electrical connectors 466 are soldered or press-fitted within first and second ends 460 and 462, respectively, of second elbow or end member 424 such that elbow or end member 424, electrical connector 464 and electrical connector 466 form a one piece member which is not readily separable.

While various advantageous embodiments have been chosen to illustrate the invention, it will be understood skilled in the art that various changes and modifications can be made therein without departing from the scope of the invention as defined in the appended claims.

What is claimed is:

1. A modular battery terminal connector assembly for electrically interconnecting a first terminal of a first battery to a first terminal of a second battery, comprising:

a first electrically conductive elbow member having first and second ends, said first conductive elbow member being substantially rigid;

a first battery terminal connector having first coupling means for releasably engaging and gripping the first terminal of the first battery, said first battery terminal connector being coupled to said first end of said first conductive elbow member;

a second electrically conductive elbow member having first and second ends, said second conductive elbow member being substantially rigid;

a second battery terminal connector having second coupling means for releasably engaging and gripping the first terminal of the second battery, said second battery terminal connector being coupled to said first end of said second conductive elbow member;

an electrically conductive connecting member having first and second ends, said conductive connecting member being substantially rigid;

third coupling means for releasably connecting said second end of said first conductive elbow member to said first end of said conductive connecting member; and fourth coupling means for releasably connecting said second end of said second conductive elbow member to said second end of said conductive connecting member.

2. A modular battery terminal connector assembly according to claim 1, wherein said first end of said first conductive elbow member has a first longitudinal axis, and said second end of said first conductive elbow member has a second longitudinal axis which is substantially perpendicular to said first longitudinal axis.

3. A modular battery terminal connector assembly according to claim 2, wherein said first end of said second conductive elbow member has a first longitudinal axis, and said second end of said second conductive elbow member has a second longitudinal axis which is substantially perpendicular to said first longitudinal axis of said first end of said second conductive elbow member.

4. A modular battery terminal connector assembly according to claim 1, wherein said conductive connecting member includes a first rigid conductive metal rod.

5. A modular battery terminal connector assembly according to claim 4, wherein said conductive connecting member further includes a second rigid conductor rod coupled to said first metal rod by a first sleeve member having a pair of coupling means for releasably connecting said first and second rods together.

6. A modular battery terminal connector assembly according to claim 1, wherein at least one of said conductive elbow members is provided with wire connection means for connecting a wire thereto.

7. A modular battery terminal connector assembly according to claim 6, wherein said wire connection means includes a threaded hole for receiving a threaded fastener.

8. A modular battery terminal connector assembly according to claim 1, wherein said first battery terminal connector is fixedly coupled to said first conductive elbow member.

9. A modular battery terminal connector assembly according to claim 8, wherein said first coupling means is a toolless socket for frictionally engaging the first terminal.

10. A modular battery terminal connector assembly according to claim 9, wherein said third coupling means is fixedly coupled to said first conductive elbow member.

11. A modular battery terminal connector assembly according to claim 10, wherein said third coupling means is a toolless socket for frictionally engaging said conductive connecting member.

12. A modular battery terminal connector assembly according to claim 11, wherein said first conductive elbow member is an angled tube.

13. A modular battery terminal connector assembly according to claim 1, wherein said first conductive elbow member is an angled rod.

14. A modular battery terminal connector assembly according to claim 13, wherein said first battery terminal connector includes fifth coupling means for releasably connecting said first end of said first conductive elbow member thereto.

15. A modular battery terminal connector assembly according to claim 14, wherein said first battery terminal connector includes a sleeve with said second and fifth coupling means fixedly coupled therein.

16. A modular battery terminal connector assembly according to claim 15, wherein said second and fifth coupling means are toolless sockets for frictionally engaging and gripping the first terminal of the first battery and said first end of said conductive elbow member, respectively.

17. A modular battery terminal connector assembly according to claim 15, wherein said conductive connecting member having said third coupling means fixedly coupled thereto at said first end of said conductive connecting member and said fourth coupling means fixedly coupled thereto at said second end of said conductive connecting member.

18. A modular battery terminal connector assembly according to claim 17, wherein said conductive connecting member includes a first sleeve member, a first conductive rod and a second sleeve member, said first sleeve member having said third coupling means fixedly coupled thereto and said second sleeve member having said fourth coupling means fixedly coupled thereto.

19. A modular battery terminal connector assembly according to claim 18, wherein each of said first and second sleeves includes a toolless socket for engaging and gripping one end of said first conductive rod.

20. A modular battery terminal connector assembly according to claim 19, wherein said third and fourth coupling means are toolless sockets for frictionally engaging and gripping said second ends of said first and second conductive elbow members, respectively.

21. A modular battery terminal connector assembly for electrically interconnecting a first terminal of a first battery to a first terminal of a second battery, comprising:

an electrically conductive connecting member having first and second ends, said connecting member being substantially rigid;

a first electrically conductive end member having first and second ends, said first end member being substantially rigid;

first battery terminal coupling member adapted to releasably engage and grip the first terminal of the first battery, said first battery terminal coupling member being coupled to said first end of said first end member;

first intermediate coupling member releasably connecting said second end of said first end member to said first end of said connecting member;

a second electrically conductive end member having first and second ends, said second end member being substantially rigid;

second battery terminal coupling member adapted to releasably engage and grip the first terminal of the second battery, said second battery terminal coupling member being coupled to said first end of said second end member; and second intermediate coupling member releasably connecting said second end of said end member to said second end of said connecting member.

22. A modular battery terminal connector assembly according to claim 21, wherein said first end of said first end member has a first longitudinal axis, and said second end of said first end member has a second longitudinal axis which is substantially perpendicular to said first longitudinal axis, and said first end of said second end member has a first longitudinal axis, and said second end of said second end member has a second longitudinal axis which is substantially perpendicular to said first longitudinal axis of said first end of said second end member.

23. A modular battery terminal connector assembly according to claim 21, wherein said connecting member includes a first rigid conductive rod.

24. A modular battery terminal connector assembly according to claim 23, wherein said connecting member further includes a second rigid conductive rod coupled to said first rod by a first sleeve member having a pair of coupling members for releasably connecting said first and second rods together.

25. A modular battery terminal connector assembly according to claim 24, wherein said coupling members of said sleeve member are toolless sockets for frictionally engaging the first and second rods.

26. A modular battery terminal connector assembly according to claim 25, wherein said sleeve member includes a third toolless socket for frictionally engaging a terminal of a third battery.

27. A modular battery terminal connector assembly according to claim 26, wherein said connecting member further includes at least one additional coupling member and a third conductive rod.

28. A modular battery terminal connector assembly according to claim 27, wherein said additional coupling member is T-shaped and has three toolless sockets.

29. A modular battery terminal connector assembly according to claim 21, wherein at least one of said conductive end members is provided with wire connection means for connecting a wire thereto.

30. A modular battery terminal connector assembly according to claim 29, wherein said wire connection means includes a threaded hole for receiving a threaded fastener.

31. A modular battery terminal connector assembly according to claim 30, wherein said first battery terminal coupling means is fixedly coupled to said first end member and said second battery terminal coupling means is fixedly coupled to said second end member.

* * * * *